United States Patent [19]

Myers

[11] Patent Number: 5,256,487
[45] Date of Patent: Oct. 26, 1993

[54] HIGH CHAR YIELD SILAZANE DERIVED PRECERAMIC POLYMERS AND CURED COMPOSITIONS THEREOF

[75] Inventor: Ronald E. Myers, Strongsville, Ohio

[73] Assignee: The B. F. Goodrich Company, Akron, Ohio

[21] Appl. No.: 923,711

[22] Filed: Jul. 31, 1992

Related U.S. Application Data

[63] Continuation-in-part of Ser. No. 447,931, Dec. 8, 1989, Pat. No. 5,136,007.

[51] Int. Cl.$^5$ .............................................. B32B 9/04
[52] U.S. Cl. .................................. 428/447; 428/446; 528/4; 528/7; 528/21; 528/24; 528/477; 528/479; 528/474
[58] Field of Search ..................... 528/21, 24, 7, 4; 428/446, 447; 525/477, 479, 474

[56] References Cited

U.S. PATENT DOCUMENTS

| | | | |
|---|---|---|---|
| 4,340,619 | 7/1982 | Gaul, Jr. | 427/228 |
| 4,482,669 | 11/1984 | Seyferth et al. | 524/442 |
| 4,645,807 | 2/1987 | Seyferth et al. | 525/474 |
| 4,705,837 | 11/1987 | Seyferth et al. | 528/31 |

(List continued on next page.)

FOREIGN PATENT DOCUMENTS 2222170 2/1990 United Kingdom .

OTHER PUBLICATIONS

An article entitled "Catalytic Polycondensation of Organosilazanes*" from the Journal of Polymer Science, USSR vol. 23, pp. 1429–1438, 1981, by A. A. Zhdanov, G. V. Kotrelev, V. V. Kazakova and Y. L. Tolchinski.
A paper entitled "Organometallic Polymers as Precursors to Ceramic Materials: Silicon Nitride and Silicon Oxynitride" by Richard M. Laine, Yigal D. Blum, Richard D. Hamlin and Andrea Chow, *Ultrastructure Processing of Advanced Ceramics*, John Wiley & Sons, pp. 761–769, 1988, N.Y., N.Y.

(List continued on next page.)

Primary Examiner—Melvyn I. Marquis
Attorney, Agent, or Firm—Hudak & Shunk Co.

[57] ABSTRACT

Novel polysiloxane-silazane preceramic polymer compositions are prepared by the controlled hydrolysis polymerization of a trimer or tetramer of a monomer of the structure

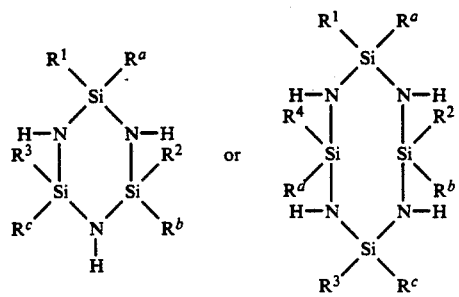

wherein $R^1$, $R^2$, $R^3$, and $R^4$ are independently alkyl groups containing from 1 to 4 carbon atoms $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group.

Another useful composition is made by reacting the above mentioned monomers with alkoxide or aryloxide compounds of the elements Al, B, Zr, Ti, Si, Hf, and Y in the presence of water to make polysilazoxane polymers modified with said alkoxides or aryloxide compounds. Another useful composition is made by reacting the polysiloxane-silazane polymer with vinyl or allyl substituted compounds of boron or silicon or both. These modified polysiloxane-silazane polymers have increased char yields and can develop other refractory phases due to the presence of other metals. Another useful composition is made by reacting substituted phenols or compounds containing substituted phenols with the above mentioned monomers. All of the above mentioned reaction products are useful as high temperature resins, fibers, etc., and as preceramic polymers to be made into ceramics by high temperature.

16 Claims, 2 Drawing Sheets

U.S. PATENT DOCUMENTS

| | | | |
|---|---|---|---|
| 4,722,988 | 2/1988 | Porte et al. | 528/24 |
| 4,772,494 | 9/1988 | Porte et al. | 528/21 |
| 4,783,516 | 11/1988 | Schilling et al. | 528/14 |
| 4,824,918 | 4/1989 | Bujalski et al. | 525/479 |
| 4,886,860 | 12/1989 | Arai et al. | 525/474 |
| 4,939,501 | 1/1987 | Seyferth et al. | 528/15 |
| 5,001,090 | 3/1991 | Schwark | 501/97 |
| 5,010,158 | 4/1991 | Colombier et al. | 528/28 |
| 5,021,533 | 6/1991 | Schwark | 528/21 |
| 5,045,399 | 9/1991 | Niebylski | 428/447 |
| 5,089,552 | 2/1992 | Myers | 524/404 |

OTHER PUBLICATIONS

An article entitled "Effects of Molecular Weight and Crosslinking on Two Preceramic Polymers" by William Toreki and Christopher D. Batich, *Department of Materials Science and Engineering,* University of Florida, Gainesville, Fla., 32611, pp. 237 & 238.

An article entitled "Organometallic Precursor Routes to Si–C–Al–O–N Ceramics," United States Air Force Office of Scientific Research, L. V. Interrante Principal Investigator, Department of Chemistry, Rensselaer Polytechnic Institute, Troy, N.Y. 12180-3590. (NTIS AD-A-237 753-9 GAR).

An article entitled "Communications to the Editor" by K. Feng and Y. H. Marian in *Macromolecules* 1991, 24, pp. 4729-4732.

An abstract from *Chemical Abstracts* for a publication entitled "Preparation of Polysilazanes for the Production of Ceramics Containing Silicon Nitride," Chemical Abstracts No. CA 112: 8080c, Authors Vaahs et al., which was a German Patent Application DE 3,741,059, Applied Dec. 4, 1987, published Jun. 15, 1989.

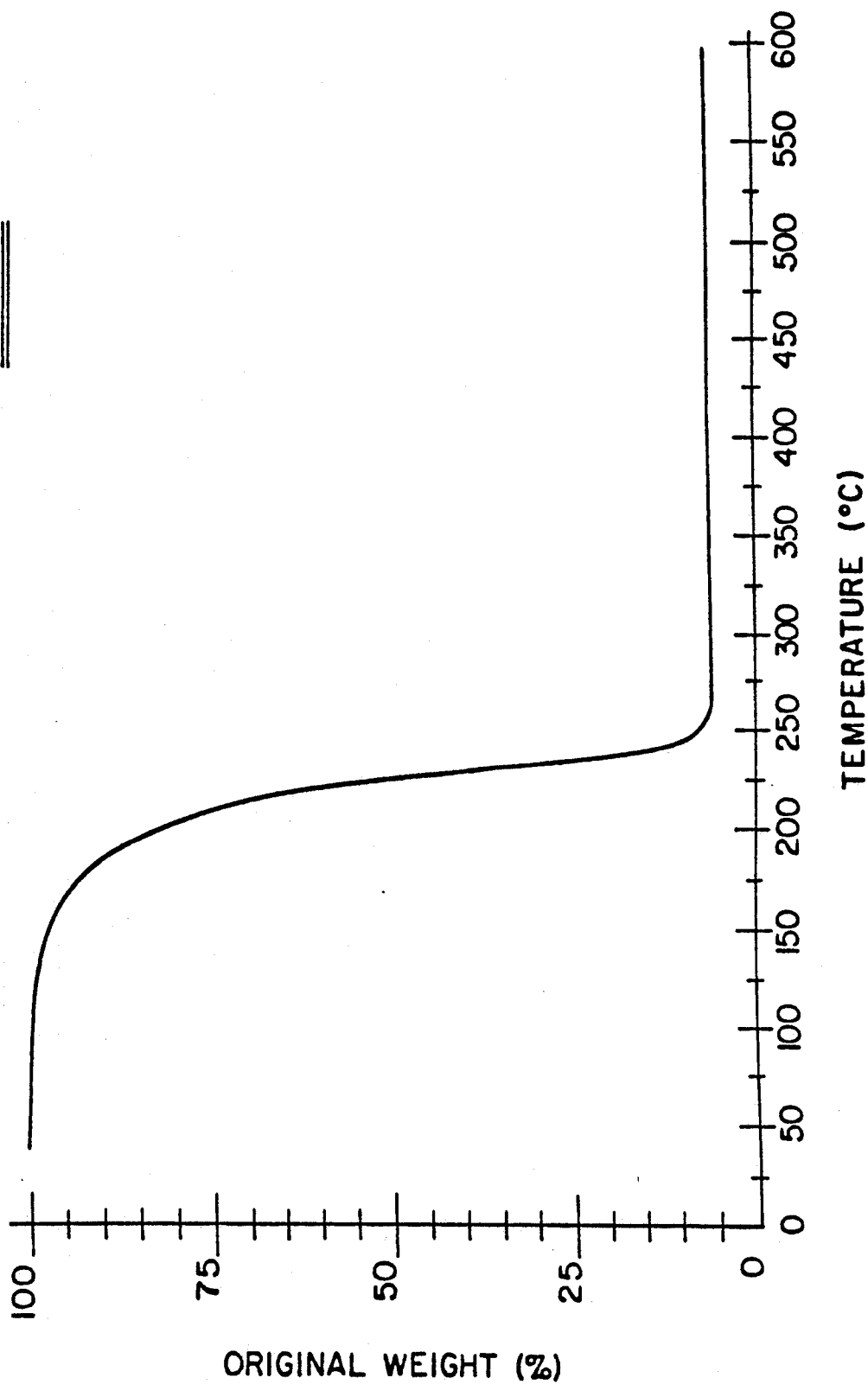

HIGH CHAR YIELD SILAZANE DERIVED PRECERAMIC POLYMERS AND CURED COMPOSITIONS THEREOF

This is a continuation-in-part of application Ser. No. 07/447,931 filed on Dec. 8, 1989 now U.S. Pat. No. 5,136,007.

FIELD OF THE INVENTION

The present invention relates to compositions which are useful as preceramic polymers as well as to cured compositions thereof.

The present invention describes the synthesis and characterization of organosilazane-derived preceramic polymers. The hydrolytic polycondensation of organo cyclic silazanes provides a high yield route to organic-soluble polysilazoxanes. Cure is effected by heating the polysilazoxanes at high temperatures such as in excess of 200° C., or at generally lower temperatures through the use of free radical initiators. Pyrolysis of the polysilazoxane resins under an inert atmosphere (such as argon) results in the formation of glassy, refractory chars consisting primarily of SiC, $SiO_2$ and carbon. Pyrolysis of the polysilazoxane resins under a reactive atmosphere condition (such as ammonia) results in the formation of glassy, refractory chars consisting primarily of SiC, $SiO_2$, carbon, $Si_3N_4$, and $Si_2ON_2$. The polysilazoxane resins produce char yields of about 60 to about 85 weight percent at temperatures of 1500° C. or less.

The further embodiments of this continuation-in-part relate to further modifications of cyclic silazanes, or to the preceramic polymers of the Detailed Description to increase the high temperature stability of the polymers or increase the char yield of the products formed. The chemical molecules used are either metal alkoxides or metal aryloxides; vinyl or aryl substituted organometallics; or various substituted phenolics.

BACKGROUND

U.S. Pat. No. 4,639,501 to Seyferth et al relates to a process for preparing preceramic polymers containing silicon, carbon and other elements, and for their pyrolysis to ceramic materials.

U.S. Pat. No. 4,645,807 to Seyferth et al relates to a process for preparing organosilicon preceramic polymers useful for making silicon carbide, SiC, and silicon nitride/silicon carbide, $Si_3N_4$/SiC, ceramics and for their pyrolysis to ceramic material.

U.S. Pat. No. 4,705,837 to Seyferth et al relates to a process for preparing silicon-containing preceramic polymers useful for making silicon oxynitride, silicon carbide, and silicon nitride/silicon carbide, ceramics and for their pyrolysis to such ceramic materials.

In a Journal of Polymer Science USSR Vol. 23, pg. 1429-1438, 1981, authored by A. A. Zhdanov, G. V. Kotrelev, V. V. Kazakova and Y. L. Tolchinskii, the catalytic polycondensation of organosilazanes is discussed. The catalytic polycondensation of organosilazanes (Andrianov reaction) was carried out using dimethylcyclosilazanes. The reaction takes place with preferential formation of hydrocarbons and some ammonia and results in polycyclic oligomeric products or polymers whose molecular structure contains a trisilyl-substituted nitrogen atom. The polycondensation of trimethyltriphenyl-cyclotrisilazane and trimethyltrivinylcyclotrisilazane occurs in the presence of KOH, alkali metals and their organodisilylamides.

A paper titled "Organometallic Polymers as Precursors to Ceramic Materials: Silicon Nitride and Silicon Oxynitride" by Richard M. Laine, Yigal D. Blum, Richard D. Hamlin and Andrea Chow, "Ultrastructure Processing of Advanced Ceramics," John Wiley & Sons, pages 761-769, 1988, N.Y., N.Y. discusses the synthesis and pyrolysis of polysilazanes and polysilazoxanes.

SUMMARY OF THE INVENTION

This invention is directed to a polysilazoxane preceramic polymer composition prepared by the controlled hydrolysis polymerization of a trimer or tetramer of a monomer of the structure

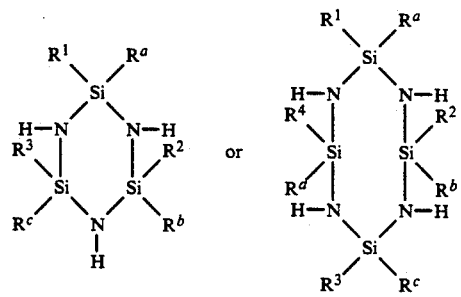

wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group.

BRIEF DESCRIPTION OF THE DRAWING

FIG. 3 is TGA profile for trimethyltrivinylcyclotrisilazane run in $N_2$.

DETAILED DESCRIPTION OF THE PRIOR EMBODIMENT OF THE INVENTION

Figure 1:
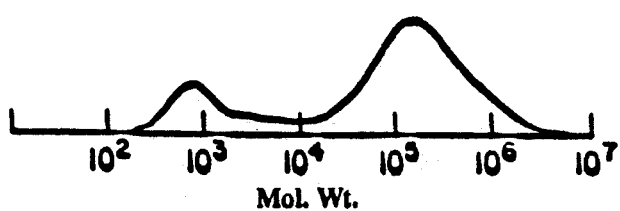
FIG. 1 is a representative molecular weight profile for polymethylvinylsilazoxane (gel permeation chromatography; polystyrene calibration standards)

The polysilazoxane preceramic polymer compositions of the present invention are prepared by a controlled hydrolysis polymerization of a cyclic siliconnitrogen monomer in the presence of water and optionally a dual initiator system.

The cyclic silicon-nitrogen monomer is represented by the structure

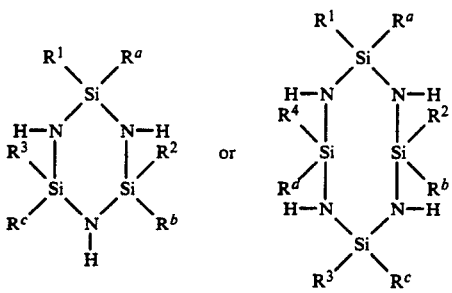

wherein $R^1$, $R^2$, $R^3$, and $R^4$ are independently alkyl groups containing from 1 to 4 carbon atoms, and preferably 1 to 2 carbon atoms. $R^a$, $R^b$, $R^c$, and $R^d$ are independently alkenyl or alkyl groups containing from 2 to 6 carbon atoms, preferably 2 to 4 carbon atoms, and most preferably 2 to 3 carbon atoms, with the proviso that at least one of $R^a$, $R^b$, $R^c$, and $R^d$ is an alkenyl group.

Within the alkenyl group the double bond may be terminal such as vinyl ($-CH=CH_2$), allyl ($-CH_2CH=CH_2$), 1-butenyl ($-CH_2CH_2CH=CH_2$), 1-pentenyl ($-CH_2CH_2CH_2CH=CH_2$), and 1-hexenyl ($-CH_2CH_2CH_2CH_2CH=CH_2$). The double bond may also be internal. Representative examples of the latter are 2-butenyl ($-CH_2CH=CHCH_3$) and 3-pentenyl ($-CH_2CH=CHCH_2CH_3$). Additionally, the carbon atoms may be branched such as 3-methyl-1-butenyl

2,3-dimethyl-1-butenyl

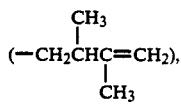

and 3,3-dimethyl-1-butenyl

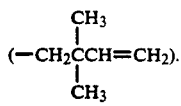

In the preferred embodiment within the trimer $R^1=R^2=R^3=$methyl and $R^a=R^b=R^c=$vinyl giving the structure

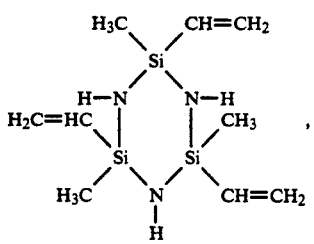

(1,3,5-trimethyl-1,3,5-trivinylcyclotrisilazane) abbreviated as TMTVTS, and is commercially available from Huls America Inc., formerly Petrarch Systems.

The degree to which the hydrolysis of siliconnitrogen compounds proceeds is influenced by the nature of the solvent system (homogeneous versus heterogeneous conditions), the pH of the solution, the reaction temperature, and the types of substituents on the silicon/nitrogen atoms (steric/electronic effects).

In the present application, the hydrolytic instability of TMTVTS has been used to advantage as the basis for a synthetic route to preceramic polymers. Thus, it has been found that the hydrolysis of TMTVTS proceeds with evolution of ammonia and the formation of a silazoxane polymer. The resulting polymer is soluble in THF, toluene and dichloromethane. The polymer was characterized by infrared spectroscopy, NMR, gel permeation chromatography, thermal gravimetric analysis and elemental analysis. Pyrolysis products were characterized by elemental analysis and x-ray diffraction.

One embodiment of this invention is that the controlled hydrolysis of the monomer is carried out in the presence of initiators, specifically a dual initiator system. Attempts were made at polymerizing TMTVTS using free radical initiators such as azobisisobutyronitrile (AIBN) or benzoylperoxide. Using these initiators TMTVTS was recovered unchanged. The controlled hydrolysis of the monomer can be effected by utilizing a dual initiator system of an aqueous persulfate/thiosulfate catalyst system. The Group I persulfate/Group I thiosulfate initiators are present in a mole ratio of from 1:0.85 to 0.85:1, preferably 1:0.95 to 0.95:1, and most preferably 1:1.

The controlled hydrolysis of the monomer can be effected by utilizing a dual initiator system of an aqueous Group I metal persulfate/Group I metal thiosulfate catalyst system. Group I metals having utility as the persulfate/thiosulfate salts are lithium, sodium and potassium. In the practice of this embodiment, the initiator system may be potassium persulfate with potassium thiosulfate, sodium persulfate with sodium thiosulfate, potassium persulfate with sodium thiosulfate or sodium persulfate with potassium thiosulfate. Lithium may be substituted with sodium or potassium or may be used in addition to sodium and/or potassium. The dual initiator system takes its name from the fact that there is at least one persulfate and at least one thiosulfate. In practicing this embodiment, a persulfate salt mixture of lithium, sodium, and potassium may be utilized along with a thiosulfate salt mixture of lithium, sodium and potassium.

In order to effect the controlled hydrolysis, the water:initiator mole ratio is from 150:1 to 400:1, preferably 200:1 to 300:1, and most preferably 200:1 to 250:1, and the water:monomer mole ratio is from 1.5:1 to 4:1, preferably 2:1 to 3:1, and most preferably 2:1 to 2.5:1.

Another embodiment of this invention is that the controlled hydrolysis of the monomer is carried out in the presence of water, that is, in the absence of an initiator system. In this embodiment, the water:monomer mole ratio is from 1.5:1 to 20:1, preferably 2:1 to 10:1 and most preferably 2:1 to 7.5:1.

Under either embodiment, in order for the polymerization to begin, heat is applied. Generally the reaction temperature is from about 100° C. to about 190° C. and preferably from about 130° C. to about 150° C. Ammonia is evolved during the reaction. Generally, temperatures in excess of those noted are avoided inasmuch as they tend to produce an intractable product. Inasmuch as the polymerization is only slightly exothermic, heat must be applied thereto. The polymerization is generally a hydrolytic condensation polymerization with some ring opening occurring. The number average molecular weight ($M_n$) of the formed polymer is at least about 3,000 and desirably from about 10,000 to about 100,000. Generally, it appears that the length of time of polymerization and the water:monomer mole ratio often is directly proportional to the amount of siloxane units produced. The amount of siloxane in the end polymer is generally from about 65 percent to about 98 percent, preferably from 80 percent to about 98 percent, and most preferably from 85 percent to about 98 percent by weight with the balance being silazane. Some silazane groups, within the polymer structure, are always desirable inasmuch as they are easily charred and yield better char properties.

On the basis of IR spectroscopy, NMR and elemental analysis, the polymethylvinylsilazoxane (PMVS) produced from the hydrolysis of TMTVTS is believed to have the following formulation (Formula I):

                                                   (I)

The values of x (siloxane content) and y (silazane content) in the above formulation will, of course, vary as a function of the extent of hydrolysis. The x and y components together make up the polysilazoxane. The end polymer, which is a combination of siloxane as well as silazane units, is generally a random copolymer. The above structure is not meant to imply that the polysilazoxane is exclusively linear. Some cyclic and branched moieties may also be present within the polysilazoxane.

The preceramic polymer compositions of this invention have utility either in the pyrolyzed or nonpyrolyzed state. Within the pyrolyzed state, the preceramic polymer compositions have utility as resins, binders, coatings, and adhesives for high temperature ceramics and/or ceramic composites In the non-pyrolyzed state, the polymeric composition of this invention has utility in the area of high temperature coatings such as adhesives, caulks, and sealants, either per se or as one of several components. Other uses for the non-pyrolyzed composition are high temperature resin matrix polymers. These non-pyrolyzed polymers would be used as a matrix resin in combination with reinforcement wherein these reinforcements include fibers, whiskers, particulates, and combinations thereof. A composite of the polymer and the reinforcement could be made by conventional polymer processing methods.

Applications for these polymer compositions include, among others:

1. formation into complex shapes and subsequent pyrolysis to give a ceramic material of the same shape;
2. spinning into continuous or discontinuous fibers whose subsequent pyrolysis yields ceramic fibers;
3. spinning into continuous or discontinuous fibers without pyrolysis to yield polymer fibers;
4. as a matrix material for carbon or ceramic fibers, or other reinforcements (with or without subsequent pyrolysis);
5. as a binder for ceramic powders (with subsequent pyrolysis to form a ceramic body);
6. infiltration of porous ceramic bodies, such as sintered silicon nitride, by the polymer itself (if liquid) or by a solution of the polymer, with subsequent pyrolysis to form a ceramic, resulting in better strength, oxidation resistance, etc., of the body.

The following examples are illustrative of the preparation of the polysilazoxane preceramic polymers of the present invention. Unless otherwise indicated, all parts and percentages are by weight.

EXAMPLE 1

TMTVTS (122.34 g, 0.48 mole) was placed in a 500 mL three-neck, round bottom flask equipped with thermometer, reflux condenser, blade stirrer and addition funnel. An aqueous persulfate/thiosulfate dual initiator solution [0.38 g (0.0024 mole) $Na_2S_2O_3$ and 0.65 g (0.0024 mole) $K_2S_2O_8$ dissolved in 19.8 mL (1.1 mole) water] was then added dropwise to the TMTVTS with rapid stirring under a nitrogen blanket. The reaction mixture was then heated at 130° C. for 10 hours/$N_2$. During the initial stage of the reaction, it was necessary to use a slow rate of heating (two hours to reach 130° C.) in order to control foaming due to ammonia evolution. The reaction mixture was then cooled to 22° C., and the resulting pale yellow, viscous liquid was dissolved in 250 mL of dichloromethane; the polymer solution was then dried over $CaSO_4$ for 16 hours. After filtering to remove the $CaSO_4$, the polymer solution was freed of dichloromethane by rotary evaporation (70° C., water aspirator). After vacuum drying (60° C./3 hours), polymethylvinylsilazoxane (PMVS) was obtained as a pale yellow, viscous liquid; yield 107 g. PMVS is soluble in dichloromethane, THF and toluene. The resulting PMVS has a molecular weight $M_n=42,100$ and $M_w=89,400$. Elemental analyses (in weight percent): carbon—41.97, hydrogen 7.27, nitrogen—3.33, silicon—29.65, and oxygen (by difference)—17.78.

EXAMPLE 2

The procedure of Example 1 was followed except that the reaction time was increased from 10 hours to 16.5 hours. The resulting PMVS had a molecular weight $M_n=51,700$ and $M_w=132,000$.

EXAMPLE 3

The procedure of Example 1 was followed except that the reaction time was increased from 10 hours to 20 hours. The resulting PMVS had a molecular weight $M_n=87,000$ and $M_w=334,000$.

EXAMPLE 4

The procedure of Example 1 was followed except that half the level of both water and TMTVTS were utilized, 0.55 moles and 0.24 moles, respectively, and the reaction time was 8.5 hours. The resulting PMVS had a molecular weight $M_n=59,500$ and $M_w=181,500$.

EXAMPLE 5

TMTVTS (25 g; 0.098 mole) was placed in a 100 mL round bottom flask equipped with thermometer, reflux condenser and magnetic stir bar. An aqueous persulfate/thiosulfate initiator solution [0.229 g (0.00145 mole) $Na_2S_2O_3$ and 0.392 g (0.00145 mole) $K_2S_2O_8$ dissolved in 12 mL (0.667 mole) water] was then added in one portion to the TMTVTS with rapid stirring under a nitrogen blanket. The reaction mixture was heated to 78° C. over a period of two hours during which time ammonia evolved from the system. The reaction temperature was then raised to 95° C. and held there for an additional 96 hours. The resulting colorless, low viscosity liquid was then cooled to 22° C. and dissolved in 175 mL of dichloromethane. The remaining workup procedure for this sample was identical to that described in Example 1. A yield of 23.6 g of PMVS was obtained. The resulting PMVS had a molecular weight $M_n=3100$ and $M_w=5600$.

Example 6 shown below illustrates the hydrolysis of TMTVTS under non-inventive parameters, i.e., using a water:monomer mole ratio of 1:1. No catalyst was used.

EXAMPLE 6

Water (1.76 mL; 0.098 mole) was added in one portion to 25 g (0.098 mole) of TMTVTS. The reaction mixture was slowly heated to 118° C. over a period of 3 hours (under nitrogen) during which time ammonia evolved from the system. The reaction temperature was then raised to 130°-140° C. and held there for an additional 18.5 hours. The resulting colorless low viscosity liquid was then cooled to 22° C. and dissolved in 100 mL of dichloromethane. The remaining workup procedure for this sample was identical to that described in Example 1. A yield of 21.78 g of PMVS was obtained. Moreover, a char yield of only 33 percent by weight was obtained.

The following examples are directed to the formation of PMVS from TMTVTS but without using any initiators. The water:monomer mole ratio is between 1.5:1 to 20:1.

EXAMPLE 7

Water (4 mL; 0.22 mole) was added in one portion to 25 g (0.098 mole) of TMTVTS. The reaction mixture was heated at 140° C. under $N_2$ for 20 hours, and the resulting clear, colorless, viscous liquid was dissolved in 100 mL of dichloromethane. The remaining workup procedure for this sample was identical to that described in Example 1. A yield of 20.4 g of PMVS was obtained. Elemental analyses (by weight percent): carbon—41.62, hydrogen—7.30, nitrogen—1.79 silicon—30.96, and oxygen (by difference)—18.33. The resulting PMVS had a molecular weight $M_n=78,500$ and $M_w=317,000$.

EXAMPLE 8

Water (12 mL; 0.667) mole) was added in one portion to 25 g (0.098 mole) of TMTVTS. The reaction mixture was slowly heated to 90° C. over a period of six hours (under nitrogen) during which time ammonia evolved from the reaction mixture. The reaction temperature was then raised to 100°-105° C. and held there for an additional 96 hours. The resulting colorless, moderately viscous liquid was then cooled to 22° C. and dissolved in 100 mL of dichloromethane. The remaining workup procedure for this sample was identical to that described in Example 1. A yield of 21.3 g of PMVS was obtained. The resulting PMVS had a molecular weight $M_n=29,900$ and $M_w=49,900$.

EXAMPLE 9

Water (35.3 mL; 1.96 mole) was added in one portion to 25 g (0.098 mole) of TMTVTS. The reaction mixture was slowly heated to 80° C. over a period of 4 hours (under nitrogen) during which time ammonia evolved from the reaction mixture. The reaction temperature was then raised to 95°-100° C. and held there for an additional 19 hours. The resulting clear, colorless, low viscosity liquid was then cooled to 22° C. and dissolved in 200 mL of dichloromethane. The remaining workup procedure for this sample was identical to that described in Example 1. A yield of 22.65 g of PMVS was obtained. The resulting PMVS had a molecular weight $M_n=3480$ and $M_w=5770$.

Gel permeation chromatography (GPC), using polystyrene calibration standards, was used to determine molecular weights of the PMVS samples. Each of the PMVS samples, irrespective of reaction conditions used in the preparation of the polymer, showed a bimodal molecular weight distribution. A representative molecular weight profile for PMVS is shown in FIG. 1. Referring to Table I, the high molecular weight fraction of these examples ranges from $M_w=5,600$ to 334,000 Daltons and $M_n=3,100$ to 87,000 Daltons.

In general, the GPC data indicate that the molecular weight of PMVS often is directly proportional to the reaction time. As shown in Table I, the $M_n$ values for Example 1 ($M_n=42,100$), Example 2 ($M_n=51,700$), and Example 3 ($M_n=87,000$) correspond to reaction times of 10 hrs., 16.5 hrs., and 20 hrs., respectively.

TABLE I

| | Hydrolytic Polycondensation of TMTVTS | | | | | | | | |
|---|---|---|---|---|---|---|---|---|---|
| | EX. 1 | EX. 2 | EX. 3 | EX. 4 | EX. 5 | EX. 6 | EX. 7 | EX. 8 | EX. 9 |
| $H_2O$: Monomer Mole Ratio | 2.29:1 | 2.29:1 | 2.29:1 | 2.29:1 | 6.8:1 | 1:1 | 2.24:1 | 6.8:1 | 20:1 |
| Persulfate: Thiosulfate Mole Ratio | 1:1 | 1:1 | 1:1 | 1:1 | 1:1 | 0:0 | 0:0 | 0:0 | 0:0 |
| Reaction Time (hrs.) | 10 | 16.5 | 20 | 8.5 | 98 | 21.5 | 20 | 102 | 23 |
| Molecular Weight | | | | | | | | | |
| $M_n$ | 42,100 | 51,700 | 87,000 | 59,500 | 3100 | — | 78,500 | 29,900 | 3480 |
| $M_w$ | 89,400 | 132,000 | 334,000 | 181,500 | 5600 | — | 89,400 | 49,900 | 5770 |

Thermal Analysis

Thermal stabilities and char yields of the PMVS samples were determined by using thermal gravimetric analysis (TGA). As shown in Table II, the products of Examples 1, 2, 4, 5, 7, 8, and 9 exhibit substantial char yields at temperatures as high as 1500° C.; 60 to 76 weight percent char when heated in flowing $N_2$ and 70 to 85 weight percent char when heated in flowing air.

TABLE II

| | Thermal Analysis (TGA of PMVS) | | | | | | | |
|---|---|---|---|---|---|---|---|---|
| | EX. 1 | EX. 2 | EX. 4 | EX. 5 | EX. 6 | EX. 7 | EX. 8 | EX. 9 |
| Temp. (°C.) of Initial Weight Loss in $N_2$ | 150 | 200 | 150 | 325 | 150 | 300 | 200 | 200 |
| Weight % Char at 1500° C. in: | | | | | | | | |

TABLE II-continued

| | Thermal Analysis (TGA of PMVS) | | | | | | | |
|---|---|---|---|---|---|---|---|---|
| | EX. 1 | EX. 2 | EX. 4 | EX. 5 | EX. 6 | EX. 7 | EX. 8 | EX. 9 |
| $N_2$ | 60 | 62 | 65 | 76 | 33 | 65 | 76 | 68 |
| Dry Air | 70 | — | 80 | 84 | — | 80 | 85 | 77 |

Figure 2:
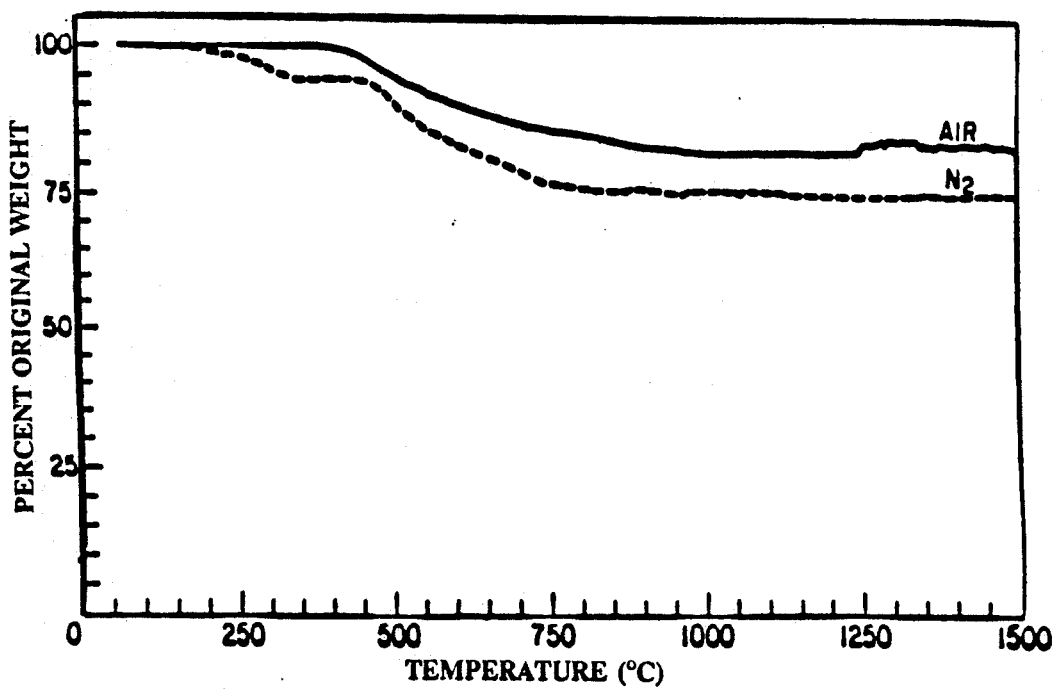
FIG. 2 is representative TGA profiles for polymethylvinylsilazoxane in dry air (solid curve) and in $N_2$ (broken curve), with a 10° C. per minute heating rate.

A representative TGA profile for PMVS is shown in FIG. 2. Onset of weight loss for this sample occurs at 200° C. in $N_2$ and at 400° C. in air. At temperatures in excess of 750°–900° C., the PMVS samples essentially show no further change in weight. It is also apparent from FIG. 2 (and is generally found for each of the PMVS samples) that these polysilazoxanes, under the conditions of the TGA run, show a higher char yield in air than in $N_2$. The higher char yields observed under oxidizing conditions may be due to: (1) enhanced formation of $SiO_2$ and/or (2) free radical-induced crosslinking reactions involving the Si—CH=$CH_2$ groups in the polymer.

In general, the char yields (of 60 to 85 percent) obtained in Examples 1, 2, 4, 5 and 7-9 are quite high. These silazoxane polymers are organic soluble liquids which physically resemble linear polysiloxanes, and as previously indicated (in Formula I), the predominant structural component of the PMVS resins is that of a siloxane. However, most simple, linear polysiloxanes (even those having high molecular weights) have a tendency to depolymerize during inert atmosphere pyrolysis. This depolymerization process leads to the formation of low molecular weight cyclosiloxanes (trimers, tetramers, etc.) which volatilize, resulting in low char yields. For example, high molecular weight ($M_n$=450,000), linear polydimethylsiloxanes have a char yield of less than 5 percent at 400° C. in $N_2$.

The high thermal stability of the PMVS resins cannot be attributed to the strength of the silazane bond, which is about 30 kcal/mole lower than that of the siloxane (Si—O) bond. Indeed, many simple polysilazanes show poor thermal stability. For example, polydimethylsilazane has essentially zero char yield as a result of depolymerization reactions which occur during pyrolysis.

According to another embodiment of the present invention, the above-noted polysilazoxane polymers can be readily cured to form a crosslinked polymer network or matrix. Curing is generally accomplished either by merely applying high heat to the polysilazoxane polymers or, optionally, utilizing a free radical initiator at generally a lower temperature. In order to cause the various polysilazoxanes to crosslink, they must be heated to at least a temperature of about 200° C., and generally from about 200° to about 300° C., desirably from about 225° to about 300° C., and preferably from about 250° to about 300° C.

As an optional alternative to the application of high cure temperatures, free radical initiators can be utilized such as the various peroxides, the various azos, and the like. The initiators generally provide cure at much lower temperatures and, hence, cure of the various polysilazoxanes can be effected generally at temperatures below 250° or 225° C., generally at a temperature of from about 40° to about 200° C., desirably from about 45° to about 180° C., and preferably from about 65° to about 130° C. The time to effect cure will generally vary with the thickness of the end product or article, and for a 1 to 3 mil thickness, it is generally from about 5 to about 15 minutes.

Examples of peroxides which can be utilized as free radical initiators include cumene hydroperoxide, benzoyl peroxide, diacetyl peroxide, dodecanoyl peroxide, di-t-butyl peroxide, dilauroyl peroxide, bis(pmethoxy benzoyl) peroxide, t-butyl peroxy pivalate, dicumyl peroxide, lauryl peroxide, methyl ethyl ketone peroxide, diisopropylbenzene hydroperoxide, 2,4-dichlorobenzoyl peroxide, naphthoyl peroxide, di-t-butyl perphthalate, isopropyl percarbonate, acetyl cyclohexane sulfonyl peroxide, and the like, with benzoyl peroxide, dicumyl peroxide, and t-butyl peroxide being preferred. In lieu of the peroxide initiators, or in combination therewith, various azo free radical initiators can also be utilized. Examples of suitable azo initiators include azobisisobutyronitrile (AIBN), alpha, alpha'-azodiisobutyrate, 2,2'-azo-bis-(2,4-dimethyl valeronitrile), and the like, with AIBN being preferred. The total amount of initiators is generally from about 0.1 to about 10 percent by weight, desirably about 0.1 to about 6 percent by weight, and preferably from about 0.1 to about 3 percent by weight based upon the total weight of the various polysilazoxane polymers.

Curing of the polymers can occur either in bulk or in a solvent solution. That is, any solvent can be utilized which does not enter into any reaction with the polysilazoxane polymers and which dissolve the polymers. Any hydrocarbon solvent can generally be utilized such as an aromatic, an aliphatic, or combinations thereof, generally having from about 6 to about 18 carbon atoms with specific examples including toluene, xylene, mineral spirits, hexane, 1-methyl-2-pyrrolidinone, and the like. An effective amount of solvent is utilized such that the polysilazoxane polymers are put into solution, that is, dissolved. The exact amount of solvent will vary depending upon the type of solvent and can be very little, such as from approximately 50 parts by weight of solvent, to several times the amount of solvent, that is, 300–400 parts, and even in excess of 1,000 parts per 100 parts by weight of polymer. When solvents are utilized, the polymers are simply added thereto and the resulting composition mixed. Heat, or heat and the above noted free radical initiators, is then applied to the composition to effect cure or crosslinking of the polymers. Cure can take place in air or in an inert atmosphere such as argon or nitrogen.

As noted above, various fibers such as ceramic, boron, carbon, glass, aramid i.e. aromatic nylon fibers, and the like, can be incorporated into the polysilazoxane polymers with the polymers subsequently being cured. The incorporation of various fibers add structural integrity and strength to the cured polymer, and often high temperature performance and oxidation resistance. The amount of fibers can vary greatly, as from about 10 to about 80 percent, and desirably from about 40 to about 80 percent by volume based upon the total volume of the various polysilazoxane polymers and the fibers.

The cured polysilazoxane polymers can be used as adhesives, binders, coatings, fibers, matrix resins, and the like, as well as for ceramic objects. Cured polymers can be utilized in the pyrolyzed or in the unpyrolyzed state. The cure of polysilazoxane polymers will be better understood by reference to the following examples.

EXAMPLE 10

Reaction of a Polysilazoxane with AIBN

A 5.0 g sample of PMVS, similar to the Example 8 polymer, was dissolved in 20 ml of toluene. AIBN (0.15 g) was added to the similar Example 8 solution, and the reaction mixture was heated to 70°–75° C. under a $N_2$ atmosphere. After a reaction time of 18 hours, the noted solution was converted to a clear, colorless, insoluble material in near quantitative yield (4.8 g). The cured polymer was vacuum dried at 70° C./2 hours. The resulting polymer had good thermal stability, in fact, better than that of the uncured similar Example 8 solution.

TABLE III

| | TGA DATA TO 1500° C./$N_2$ (10° C./MIN HEATING RATE) | |
|---|---|---|
| | Temp. of Initial wt. loss/$N_2$ | wt. % char at 1500° C. |
| Cured polysilazoxane of Example 10 | 450° C. | 80.4% |
| Uncured polysilazoxane similar to Example 8 | 200° C. | 75.9% |

The reaction of the polysilazoxane similar to that of Example 8 with AIBN was unexpected inasmuch as the silazane monomer from which the product of a composition similar to Example 8 is synthesized, that is, TMTVTS, is unreactive with AIBN. That is, when TMTVTS was heated in the presence of AIBN (either in bulk or in a toluene solution) for times of from 70 to 100 hours at 70° C., the TMTVTS was recovered unchanged. Since AIBN is known to be reactive toward vinyl groups, it was unexpected that AIBN would react only with the polysilazoxane product which is similar to that of Example 8.

EXAMPLE 11

Reaction of Polysilazoxane of Example 2 with Benzoyl Peroxide

A 5.0 g sample of the polysilazoxane of Example 2 was dissolved in 20 ml of toluene. Benzoyl peroxide (0.3g) was added to this solution, and the reaction mixture was heated to 65°–70° C. for 1 hour under a $N_2$ atmosphere. The originally soluble polysilazoxane of Example 2 was converted to an insoluble material. After vacuum drying at 70° C./2 hrs., a yield of 4.5 g of cured polysilazoxane of Example 2 was obtained.

TABLE IV

| | TGA DATA TO 1500° C./$N_2$ (10° C./MIN. HEATING RATE) | |
|---|---|---|
| | Temp. of initial wt. loss | Wt. % char at 1500° C. |
| Cured polysilazoxane of Example 11 | 225° C. | 75% |
| Uncured polysilazoxane of Example 2 | 200° C. | 62% |

EXAMPLE 12

Thermal Curing of Polysilazoxane of Example 2

A sample of the polysilazoxane of Example 2 was poured onto a glass plate and was heated in air on the hot stage of a melting point apparatus. The 1 mil thick polysilazoxane of Example 2 was converted to a hard, cured coating within 5 minutes at 250° C. The cured polysilazoxane of Example 2 was then tested for solubility by immersion in toluene at 25° C. for 12 hours. No weight loss of the polysilazoxane of Example 2 was observed following this treatment.

As apparent from the above example, high temperature heat alone was found to cure the polysilazoxane polymers.

The cured polysilazoxane polymers of the present invention are useful as impregnants, coatings, adhesives, binders, fibers, matrix resins, and the like, as well as for making ceramic articles. The cured polymers can also be utilized in an unpyrolyzed as well as pyrolyzed state.

DETAILED DESCRIPTION OF FURTHER EMBODIMENTS OF THE INVENTION a.) Reaction of vinyl or allyl containing cyclic silicon-nitrogen monomers with water and alkyloxides or aryloxides of boron, zirconium, silicon, aluminum, hafnium, yttrium and titanium to make metal modified poly(silazoxanes)

The cyclic silicon-nitrogen monomers of the previous Detailed Description represented by the structures:

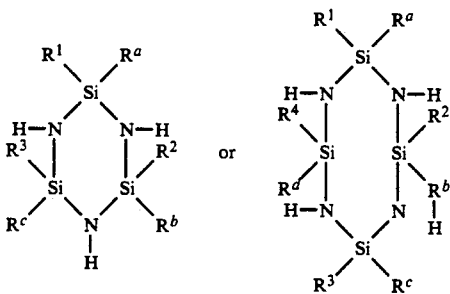

wherein $R^1$, $R^2$, $R^3$, and $R^4$ are independently alkyl groups containing from 1 to 4 carbon atoms, $R^a$, $R^b$, $R^c$, and $R^d$ are independently alkenyl groups of 2 to 6 carbon atoms or alkyl groups containing from 1 to 6 carbon atoms with the proviso that at least one of $R^a$, $R^b$, $R^c$, or $R^d$ group is an alkenyl group; are reacted with various alkoxide or aryloxide compounds of Al, B, Hf, Si, Ti, Y and Zr in the presence of water to make modified polysilazoxane resins. The mole ratio of water to cyclic siliconnitrogen monomers is from about 1.5:1 to about 20:1, desirably from about 2:1 to about 10:1, and preferably from about 2:1 to about 7.5:1. The alkoxide or aryloxide compounds are preferably of B, Si, and Zr. The alkoxide compounds of these elements are preferred over the aryloxide. The alkyl groups of the alkoxides can be any linear or branched alkyl from 1 to 12 carbon atoms and desirably from 1 to 4 carbon atoms. The aryl group of the aryloxides can be any aryl group with from 6 to 18 carbon atoms and desirably with from 6 to 12 carbon atoms. The alkoxide or aryloxide compounds of this embodiment may have one or more alkyloxide substituent along with one or more aryloxide substituent.

These cyclic silicon-nitrogen monomers can be obtained by reacting organodihalosilanes having the desired organo groups with ammonia to form an ammonolysis product which is a variety of cyclic and linear silazane oligomers. Or these monomers are commercially available in purer forms from various silane chemical producers. The ammonolysis reactions of silanes are further described by S. D. Brewer and C. P. Haber, *J. Amer. Chem. Soc.*, 1948, 70, 3888-91.

The alkoxide or aryloxide compounds of Al, B, Hf, Si, Ti, Y and Zr need have only one alkoxide or aryloxide group but preferably have two or more alkoxide or aryloxide groups. The remaining substituents of the compounds can be alkoxides or aryloxides groups meeting the above requirements or alkyl, aryl, or alkenyl groups of 1–6 carbon atoms. The compound's chemical structures where M represents Al, B, Hf, Si, Ti, Y and Zr can be represented by $$M(R^5)_n \text{ or } (R^6)_aM(R^5)_{n-a}$$

where $R^5$ represents one or more of the above described alkoxide or aryloxide groups, $R^6$ represents one or more alkyl, aryl, or alkenyl groups having 1 to 6 carbon atoms, preferably 1 to 4 carbon atoms, and n is 4 for Si, Zr, Hf and Ti while n is 3 for B, Al, and Y. The variable "a" can be any number less than or equal to $(n-1)$.

Alternatively, the hydrolysis products from the above alkoxide or aryloxide of Al, B, Hf, Si, Ti, Y and Zr can be used instead of the alkoxide or aryloxide compounds.

The cyclic silicon-nitrogen monomers can be one pure monomer or blends of one or more monomers. Two preferred monomers are 1,3,5-trimethyl-1,3,5-trivinylcyclotrisilazane (TMTVTS) and 1,3,5,7-tetramethyl-1,3,5,7-tetravinylcyclotetrasilazane.

The preferred mole ratio of the alkoxide or aryloxide compounds of Al, B, Hf, Si, Ti, Y and Zr to the siliconnitrogen monomers can be from about 1:4 to about 4:1 and desirably from about 1:2 to about 2:1, and preferably from about 0.5–1 to about.1:1. The reaction is typically run as a stirred reaction starting at room temperature. Exothermic reactions can occur causing higher temperatures and these are controlled by the volatilization of reactants or by-products. External heating can be used to push the reaction to completion. The alkoxide or aryloxide compounds of Al, B, Hf, Si, Ti, Y and Zr can be added dropwise to a blend of cyclic siliconnitrogen monomers and water; or water can be added dropwise to a blend of alkoxide or aryloxide compounds of Al, B, Hf, Si, Ti, Y and Zr with cyclic siliconnitrogen monomers. After the exothermic reaction, the components can be further heated to promote further reactions. The reaction temperature range is from about 25° C. to about 130° C., and preferably from about 60° C. to about 120° C. The reaction is desirably carried out under an inert atmosphere of argon or nitrogen and continues between 1 and 15 hours depending on the reactants.

The reaction of water and the cyclic siliconnitrogen monomers (silazanes) has been described fully in the Detailed Description. The reaction is generally a hydrolytic condensation polymerization (hydrolytic polycondensation) with some ring opening occurring. This reaction involves the loss of some ammonia from the reactants and the creation of some Si—O bonds in the polymer chain. It is theorized that these Si—O bonds come from condensation reactions of Si—OH bonds. These Si—OH bonds from the silazane monomers could theoretically react with the alkoxide or aryloxide compounds of Al, B, Hf, Si, Ti, Y and Zr in the hydrolyzed or nonhydrolyzed state. The hydrolysis products of the alkoxide or aryloxide compounds of Al, B, Hf, Si, Ti, Y and Zr could also condense with themselves to yield largely inorganic oxides of these elements that can be physically entrained with the polysilazoxane polymer from the water and cyclic silicon-nitrogen monomers (silazanes). Optionally one can include the dual initiator (persulfate/thiosulfate) of the Detailed Description in the concentrations and under the conditions specified therein in the reaction mixture of this embodiment.

This reaction can yield one or more different isolatable reaction products. The grams of product(s) produced per gram of reactants is above about 0.5, desirably above about 0.7, and preferably above about 0.8 gram. The char yield on charring this solid product under $N_2$ in a (TGA) thermogravimetric thermal analyzer, raising the temperature 10° C./min up to 1500° C. is above about 0.5, desirably above 0.6, and preferably above 0.7 grams of char per gram of the dried product of the reaction of alkoxide or aryloxide compounds of Al, B, Hf, Si, Ti, Y and Zr with water and a cyclic siliconnitrogen monomer.

As with the non-modified polysilazoxane of the Detailed Description, this modified polysilazoxane can be crosslinked by using the free radical generating initiators and conditions as set forth in the Detailed Description or by use of high temperature crosslinking as set forth in the Detailed Description. Further crosslinking would be anticipated to further enhance the char yield.

The utility of this portion of the embodiment is high molecular weight species having low volatility that can be used as impregnants, coatings, adhesives, binders, fibers, matrix resins and the like for high temperature use. High temperature use for non-pyrolyzed polymers are desirably 200°–500° C. and preferably 200°–400° C. When used as impregnants they can be generated in situ inside the porous shaped articles. These species can be used in the non-pyrolyzed state as high temperature polymers as well as ceramics in the pyrolyzed state. Ceramics having these additional elements besides silicon would form different ceramic-refractory phases such as aluminosilicates or zirconium silicates on pyrolysis and would be applicable to a wider range of uses. These non-pyrolyzed high temperature stable polymers or ceramics can protect surfaces against high temperature degradation. These polymers in the pyrolyzed or non-pyrolyzed state can be used in combination with various refractories in the form of particulates, discontinuous fibers or continuous fibers. These polymers can be molded into shaped articles or impregnated into shaped articles. Examples 13, 14 and 15 show a specific example of how such material can be made and converted to high temperature ceramics.

(b) Reaction of poly(organosilazoxane) with vinyl substituted compounds of boron and/or silicon.

The polysilazoxane preceramic polymer compositions (PMVS) whose formation is described in the Detailed Description can be further reacted with vinyl substituted compounds or allyl-substituted compounds containing boron or silicon in the presence of molecules capable of generating free radicals to produce modified polysilazoxane polymers having higher yields of ceramic material when charred. The polysilazoxane preceramic polymer compositions can be any of those described in the Detailed Description. The vinyl or allyl substituted compounds useful for this embodiment have at least one vinyl or allyl group containing 2 to 10, desirably 2 to 6, and preferably 2 to 4 carbon atoms. The vinyl or allyl substituted compounds can contain a single boron or silicon atom or can be silicon and/or boron containing oligomers or polymers preferably having Molecular weight up to 5,000, preferably 200 to 3,000, with at least 20 mole percent of the backbone silicon or boron atoms having a vinyl or allyl substitution.

The vinyl or allyl substituted compounds can also be compounds of the structure $R^1R^2BR^3$ where $R^1$, $R^2$, and $R^3$ can individually be hydrogen, alkyls of 1-6 carbon atoms, or alkenyls of 2-6 carbon atoms, or $R^1R^2R^3SiR^4$ or $—(R^1R^2R^3Si)—$, where $R^1$, $R^2$, $R^3$ and $R^4$ can individually be hydrogen, alkyls of 1-6 carbon atoms, or alkenyls of 2-6 carbon atoms; or $—(R^1R^2Si)_n—$ or $(R^1R^2Si—O)_n$ where $R^1$ and $R^2$ can be hydrogen, alkyls of 1-6 carbon atoms, alkoxy groups of 1-6 carbon atoms, or alkenyls of 2-6 carbon atoms and n is any integer such that the molecular weight of $—(R^1R^2Si)_n—$ is preferably less than 5,000 and desirably less than 3,000, wherein all such above compounds must have at least one alkenyl group and are desirably free of hydrogen substituent groups.

The vinyl or allyl substituted compounds can also be the cyclic silicon-nitrogen monomers of the Detailed Description or can include cyclic silicon-nitrogen monomers which may contain hydrogen groups on the Si atoms in addition to the groups specified as substituent groups previously.

Polycarbosilanes to be used are those carbosilanes having a backbone of $—(R^1R^2Si—(CH_2)_n—)$ including structures branched at one or more silicon atom in the backbone where $R^1$ and $R^2$ can individually be alkyl or alkenyl groups with 1-6 carbon atoms and "n" can be integers up to 3.

Specific examples of vinyl or allyl substituted compounds of boron or silicon are boronvinylborazine, vinyl substituted borazines, 2-vinylpentaborane, triallylborate, dimethylvinylborane, methylvinylborane, trivinylborane, vinyltriethoxysilane, divinyldiethoxysilane, tetramethyldivinylsiloxane, vinyltrimethylsilane, vinyl containing polysilanes, trivinylmethylsilane, tris(vinyldimethylsiloxy)-methylsilane, 1,3,5-trivinyl-1,1,3,5,5-pentamethyltrisiloxane, 1,3-divinyltetramethyldisilazane, divinyldimethylsilane, poly(vinylcarbosilanes), 1,3,5,7-tetramethyl-1,3,5,7-tetravinylcyclotetrasilazane, and oligomers of molecular weight from 300 to 700 of vinyl(methoxy) siloxane.

The vinyl or allyl substituted compounds containing silicon can also be various polymers having silicon as one of the backbone atoms in the polymers preferably having molecular weight 200 to 5,000, and desirably from 200 to 3,000, as described above with at least 20 mole percent of said backbone silicon or boron atoms having a vinyl or allyl substituent. Examples from journals and patents describing silicon containing polymers capable of having this amount of vinyl are described below.

Suitable polymers include those described by Ke Feng et al. in Communication to the Editor in *Macromolecules* 1991, 24, 4729-4732 as "Hybrid Silazane-/Silylamine Preceramic Telechelic Polymers". These are the reaction product of ethylenediamine (EDA) and dichloromethylvinylsilane.

Suitable polymers include poly(disilyl) silazane polymers made by the teachings of U.S. Pat. No. 4,340,619. This polymer is the reaction product of one or more compounds of $(Cl_aR_bSi)_2$ with one or more compounds of $(R_3'Si)_2NH$, wherein R is a vinyl or alkyl group of 1-3 carbon atoms or the phenyl group, R' is vinyl, hydrogen, an alkyl group of 1-3 carbon atoms, or the phenyl group, "a" has a value of 0.5-3, "b" has a value of 0-2.5 and the sum of a+b is equal to 3.

Suitable polymers include vinyl containing preceramic organosilazane polymers made by the teachings of U.S. Pat. No. 4,482,669. These are the reaction product of cyclic silazanes having the repeat unit—N(H)—Si(R)(H)—; where R can be hydrogen, an alkyl group of 1-6 carbon atoms, an alkenyl group of 2-6 carbon atoms, an aryl group of 6-10 carbon atoms, an alkoxy group of 1-6 carbon atoms, alkylsilyl or alkylamino group of 1-6 carbon atoms; and a basic catalyst capable of deprotonating an NH group that is adjacent to the SiH group.

Suitable polymers include preceramic polymers made according to the teachings of U.S. Pat. No. 4,645,807. These are the reaction product of alkali metal amides or silylamides in catalytic quantities with an organo polysilane of the formula $[(RSiH)_x(RSi)_y]_n$ where R is a lower alkyl with 1-6 carbon atoms or an alkenyl group having from 2-6 carbon atoms, or a substituted or unsubstituted aryl group having 6-10 carbon atoms, or a di or tri(lower) alkylsilyl group, wherein n is an integer greater than 1 and $x+y=1$; wherein said silylamides are preferably of the formula $[R^1SiHN—H)_a(R^1SiN)_b(R^1SiHNM)_c]_m$ where $a+b+c=1$; $R^1$ is an alkyl of 1-6 carbon atoms or any alkenyl with 2-6 carbon atoms, or a substituted or unsubstituted aryl with 6-10 carbon atoms, di or tri alkysilyl or di alkylamino group of 1-6 carbon atoms; M is an alkali metal or ½ equivalent of an alkali metal; and m is an integer greater than one.

Suitable polymers include polysilanes containing olefinic groups as described in U.S. Pat. No. 4,783,516. These are the reaction products of halogencontaining organosilane monomers or mixtures thereof with sodium metal in an appropriate solvent or solvents. Such polysilanes are made from $R_xR_y^1Si[(CH_2)_nX]_z$ where R is hydrogen or an alkyl, aryl or aralkyl group containing 1 to 10 carbon atoms, $R^1$ is an alkenyl group containing 2 to 8 carbon atoms, X is a halogen, n is zero or an integer, $x+y+z=4$, and y and z are individually at least one.

Suitable polymers include vinyl-containing polysilanes of U.S. Pat. No. 4,824,918. These are the reaction products of the formula of [RSi] [$R_2Si$], with 0-60 mole percent of [$R_2Si$] and 40-100 mole percent [RSi], or polysilanes of the formula [RSi] [$R_2Si$] [R"Si]; where there are 0-40 mole percent of [$R_2Si$] units, 0.1 to 99.9 mole percent [RSi] units and 0.1 to 99.9 mole percent [R"Si] units; where R is an alkyl with 1-8 carbon atoms, R" is an alkyl radical with more than 6 carbon atoms or an alkyl containing silyl and optionally Cl or Br; with $R^1$ Mg X or $R^1$ Li X wherein $R^1$ is an alkyl of 1-8 carbon atoms or a phenyl, while X is Cl, Br, or I.

Suitable polymers include isocyanate and isothiocyanate-modified polysilazanes as described in U.S. Pat. No. 5,001,090. These are the reaction products prepared by addition polymerization of silazanes prepared by the ammonolysis reaction of ammonia with $RSiX_3$, $RR^1SiX_2$ and mixtures thereof; wherein X is Cl, Br, or I, R and $R^1$ are independently H, substituted or unsubstituted 1-6 carbon alkyl, aryl, alkynyl groups, 1-6 carbon alkenyl groups; wherein at least one of said halogenated silicon compounds contains Si—H; with isocyanates, isothiocyanates, ketenes, thioketenes, carbodiimides, or carbon disulfide at concentrations of 0.1 to 30 weight percent based on the ammonolysis product, and wherein said isocyanates and isothiocyanates can be mono or polyfunctional having 1-6 carbon alkyl, aryl, alkenyl, or alkynyl groups.

Suitable polymers include polysiloxazane polymers as described in U.S. Pat. No. 5,010,158. These are the reaction product of a halosilane $(R_1)_a(R_2)_bSi(Y)_{4-(a+b)}$ with at least one hydrazine having the formula $NHR_3$—$NHR_4$ and water, Wherein $R_1$ and $R_2$ are a hydrogen atom or a methyl, ethyl, vinyl, or phenyl radical, $R_3$ and $R_4$ are hydrogen atoms, Y is a halogen atom, and (a+b) is an integer between 0 and 3, and preferably 2.

Suitable polymers include poly((thio)ureasilazane) as described by U.S. Pat. No. 5,021,533. These are the reaction product of ammonia or a mixture of ammonia and a substituted 1-4 carbon alkyl or aryl amine with halogenated silicon compounds such as $RSiX_3$, $RR'SiX_2$, or mixtures thereof including R R'R"Si X, and $SiX_4$ wherein X can be Cl, Br, or I; R, R', and R" can individually be H, substituted or unsubstituted 1-6 carbon alkyl, aryl, 1-6 carbon alkenyl, and 1-6 carbon alkynyl groups; with from about 0.1 weight percent to about 30 weight percent based on the ammonolysis product of an isocyanate or isothiocyanate, wherein said isocyanate or isothiocyanate is 1-6 carbon alkyl, aryl, 2-6 carbon alkenyl, or 2-6 carbon alkynyl and is monofunctional or polyfunctional, and wherein at least one of the silicon compounds has a Si—H bond.

Suitable polymers include polysilanes as described in Great Britain Patent 2,222,170. These are the reaction products of polysilanes, substituted with alkyl, phenyl, or (halo) silylalkyl group, with a vinyl Grignard and/or a vinyl lithium under anhydrous conditions.

The molecules used to produce free radicals are azo initiators, peroxides, persulfates, or the dual initiator system all further described in the Detailed Description. The molecules used to produce free radicals can also be peresters such as t-butyl perbenzoate, redox initiators, or photochemical initiators. The amounts of initiator used are the same as in the Detailed Description for curing the polysilazoxane polymers.

The molecules used to produce free radicals, the polysilazoxane preceramic polymers and the vinyl or allyl substituted elements are mixed in a container under inert atmosphere (inert to free radicals such as Ar or N) at an appropriate temperature for the free radical initiator (molecules used to produce free radicals) to generate free radicals. The temperature range for these initiators to function is from about 40° C. to about 225° to 250° C., desirably from about 45° C. to about 200° C., and preferably from 65° C. to about 180° C.

Solvents for the polysilazoxane can be used to reduce the viscosity of the mixture during the reaction. Specific examples of solvents are toluene, xylene, mineral spirits, hexane, 1-methyl-2-pyrrolidinone, and the like. These reactions can be carried out for various amounts of time such as from 1 hour to 15 hours and preferably from about 5 to about 12 hours. The modified polysilazoxane preceramic polymers achieved by these reactions can have the compounds containing boron and/or silicon contained in the reaction product by physical entanglement or by chemically bonding.

The char yield on charring these modified preceramic polymers with 10° C. temperature rise per minute in nitrogen to 1500° C. is above 0.5, desirably above 0.6, and preferably above 0.65 g char per 1 g of modified preceramic polymer. Example 16 shows a specific example of how these polymers are made and converted to ceramics.

The pyrolysis or charring can be done under an inert atmosphere such as Ar, $N_2$, or He. The pyrolysis can also be done under what is termed reactive atmospheres, such as ammonia, which may enhance the formation of nitrides and oxynitrides such as BN, $Si_3N_4$, $Si_2ON_2$, etc.

These modified preceramic polymers are useful in the pyrolyzed or non-pyrolyzed form as impregnants, coatings, and matrix resins for ceramics and carbon/carbon composites. When used as impregnants, they can be generated in situ inside a porous shaped articles or impregnated into porous shaped articles. The resins are also useful, either alone or in combination with various refractories (i.e. Sic, $Si_3N_4$, $B_4C$) in the form of particulates, discontinuous fiber or continuous fibers for fabrication of high temperature resin matrix and/or ceramic composites. High temperature resin matrix as used in this specification refers to use temperatures of desirably 200° to 500° C., and preferably about 200° to 400° C. The resins are also useful as high temperature adhesives and coatings.

(c) Reaction of cyclic vinyl containing silicon-nitrogen monomers with compounds containing substituted phenols.

The cyclic silicon-nitrogen monomers of the Detailed Description represented by the structures

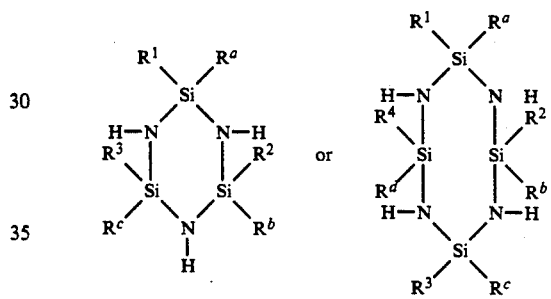

wherein $R^1$, $R^2$, $R^3$, and $R^4$ are independently alkyl groups containing from 1 to 4 carbon atoms, $R^a$, $R^b$, $R^c$, and $R^d$ are independently alkenyl groups containing 2 to 6 carbon atoms or alkyl groups containing from 1 to 6 carbon atoms with the proviso that at least one of $R^a$, $R^b$, $R^c$, or $R^d$ group is an alkenyl group; are reacted with various substituted phenols or substituted phenol containing molecules to yield reaction products having high char yields. The preferred substituted phenols or substituted phenol containing molecules have meta and para substituted phenols and do not have substantial amounts of non-substituted phenols nor amines nor alkyamines in the ortho position on the phenols. These molecules containing substituted phenols are desirably of molecular weight from about 109 to about 600. In defining the para and meta substitution for the purpose of this specification, one considers the hydroxy group of the phenol as the primary substituent and the other substituents are ortho, meta, or para to the hydroxy.

Useful phenol containing compounds include structures such as

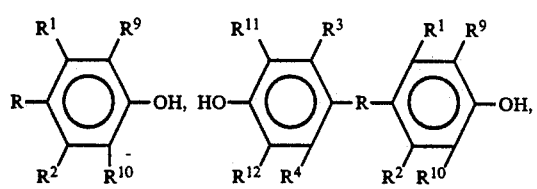

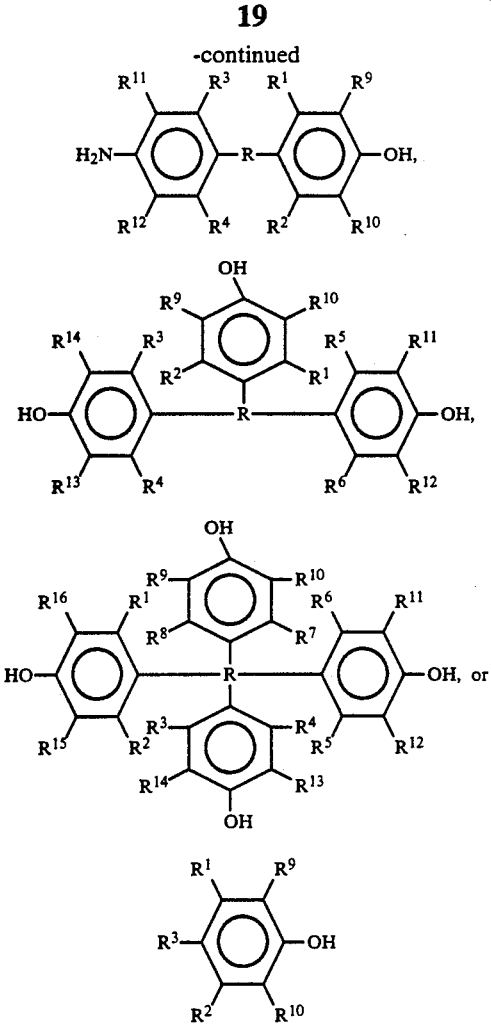

where R can be any linear or branched alkyl with up to 12 carbon atoms, desirably up to 8 carbon atoms, and preferably up to 4 carbon atoms, or R if disubstituted can also be a C—(CF$_3$)$_2$ group, wherein R$^1$, R$^2$, R$^3$, R$^4$, R$^5$, and R$^6$ can be different groups or the same group and they can be H, alkyls with from 1 to 5 carbon atoms, alkenyls with 1 to 5 carbon atoms, amine groups, alkylamine groups where the alkyl portion has from 1 to 5 carbon atoms, with the requirement that substantially all phenol groups have at least one ortho or para substituent other than H. The R$^9$ through R$^{16}$ can be individually a hydrogen, vinyl, or allyl.

The compound containing a phenol is reacted with the cyclic silicon-nitrogen monomers at temperatures between 25° C. and 250° C. and desirably 50° C. to 210° C. for sufficient time to cause a chemical reaction to occur between the two components. A preferred time is 1 to 5 hours with a preferred range of temperatures between 90° and 250° C. The reaction can generally be done with or without solvents. Any good solvent for the cyclic silicon-nitrogen monomers and the molecules containing substituted phenols such as toluene and acetonitrile would be acceptable. The reaction is typically run under an inert gas such as nitrogen or argon. The evolution of ammonia typically occurs during the reaction indicating conversion of the cyclic silicon-nitrogen monomers to other species.

Examples of the substituted phenol containing compounds useful in this invention are p-aminophenol, 4,4'-isopropylidenediphenol (also known as bisphenol A), 2,2-bis(3,5-dimethyl-4-hydroxyphenyl)-propane, bisphenol hexafluoroacetone, 2,2',4,4'-tetrahydroxybiphenol, 2,2'4,4'-tetrahydroxybenzophenone, 1,3,5-trihydroxybenzene, tris(hydroxyphenyl) ethane, and o,o'-diallyl bisphenol A also known as [4,4'-(1-methylethylidene)bis(2-(2-propenyl)phenol] sold under the trademark "Matrimid" 5292B, a Ciba-Geigy product).

The cyclic silicon-nitrogen monomers can be one pure monomer or a blend of one or more monomers. Two preferred monomers are 1,3,5-trimethyl-1,3,5-trivinylcyclotrisilazane and 1,3,5,7-tetramethyl-1,3,5,7-tetravinylcyclotetrasilazane.

The reaction product formed from the reaction of the substituted phenolic compounds with the cyclic silicon nitrogen containing monomers can be further polymerized or cured by thermal methods or by various free radical initiators as described and explained for the polysilazoxane in the Detailed Description. The peroxides and azo free radical initiators described in the Detailed Description can be used in the same relative amounts and under the same conditions as for the polysilazoxanes to give further crosslinking. Persulfates can also be used instead of or in addition to peroxides under the same conditions.

The reaction products developed from the interaction of the compounds containing various meta and para-substituted phenolics with the cyclic silicon-nitrogen monomers have high char yields even without extra steps involving free radical or thermal curing. Char yields are above about 60 percent, desirably above about 65 percent, and preferably above about 70 percent by weight.

These phenolic modified silicon-nitrogen monomers are useful as matrix resins alone or in combination with various refractory additives such as SiC, Si$_3$N$_4$, B$_4$C and the like in the form of particulates, discontinuous fibers or continuous fibers for the fabrication of high temperature ceramics/refractories and carbon/carbon composites. These phenolic modified silicon-nitrogen monomers are also useful as matrix resins for the fabrication of high temperature polymer matrix composites, i.e., in composites wherein no pyrolysis step would be used in their manufacture. These materials are also useful as adhesives. They are useful in pyrolyzed or non-pyrolyzed form. They can be molded into shaped articles or impregnated into porous shaped articles or coated on other articles.

Examples 17 through 22 show further details of experimental procedures to form these from specific phenolic compounds and silicon-nitrogen monomers. Comparative examples 23 through 24 show hydroxyl containing molecules that do not react with the silazanes to give high char products. Comparative examples 25, 26, and 27 show the unreacted phenol-containing compounds are not high char yield materials under identical conditions.

EXAMPLE 13

Reaction of TMTVTS with Zirconium N-Propoxide

TMTVTS (15.0 g; 0.06 mole) and water (6.17 g; 0.34 mole) were charged to a 100 mL round bottom flask equipped with stir bar, reflux condenser, thermometer and addition funnel. Zirconium n-propoxide 0.044 mole; 20.6 g of a 70 percent solution in n-propanol) was added dropwise to the TMTVTS/H$_2$O mixture at 25° C. During the initial addition of the zirconium propoxide, a reaction exotherm occurred and the temperature increased to 85° C. This was accompanied by the evolution of ammonia and the formation of a yellow precipitate. After addition of the propoxide was complete the contents of the flask were heated to 97° C. under a nitrogen blanket for 8 hours. The reaction mixture was then cooled to 25° C., and 50 mL of THF were added to the flask. After a 24 hour soak in THF, the reaction mixture was filtered to give two products; a yellow, insoluble solid (6.2 g) and a THF-soluble, yellow wax-like solid (10.4 g) obtained from the filtrate. Both products had similar, but not identical, infrared spectra. Both products had similar TGA profiles and similar TGA char yields (77–83 weight percent char at 1500° C./$N_2$). XRD analysis of the pyrolyzed (1500° C. 4 hrs. under argon) reaction products showed $ZrO_2$ (orthombic & monoclinic), $ZrSiO_4$ (zircon; zirconium silicate), 2 crystalline forms of $SiO_2$ and $\beta SiC$. The above described reaction was repeated, changing only the order of addition of the reactants; water was added dropwise to the zirconium propoxide/TMTVTS mixture. As before, two products were obtained from this reaction; a yellow, insoluble solid (10.7 g) and a THF-soluble, yellow waxlike solid (7.5 g). Thermal analyses and infrared spectra were similar to those obtained from the reaction wherein the zirconium propoxide was added to the TMTVTS/$H_2O$ mixture. The relative product yields of THF-soluble and insoluble were, however, found to be reversed from those reported above.

Example 13 shows that the TMTVTS reacts with metal alkoxides to form solids that can be soluble or insoluble in THF. The second portion of Example 13 shows that the water can be the last added component. The TGA analysis of this material using a 10° C. rise/min under $N_2$ to 1500° C. produced high char ceramic materials. The TGA char yields of 77–83 weight are much higher than those of TMTVTS or PMVS without the zirconium n-propoxide which are shown in Table II.

EXAMPLE 14

Reaction of TMTVTS with Boric Acid

Boric acid (3.65 g; 0.059 mole) was dissolved in 15.4 mL of water (0.86 moles) at 80° C. TMTVTS (15.0 g; 0.059 mole) was added dropwise to the stirring boric acid solution at 80° C. under $N_2$ atmosphere. The reaction was maintained at 105° C. for 11 hours. The mixture was cooled to 25° C. and the water layer was removed. The remaining contents were dissolved in dichloromethane and the organic phase dried over $CaSO_4$. The dichloromethane was removed on a rotovap to yield 13.3 g of a colorless oil. A TGA of the oil showed a char yield of 77 weight percent in $N_2$ at 1500° C. Infrared analysis of the neat oil-like product shows bands indicative of B—N or B—O bonds.

Example 14 shows that TMTVTS can react at 105° C. with the hydrolysis product of boric acid esters to yield polymers having high char yield.

EXAMPLE 15

Reaction of $Si(OC_2H_5)_4$ with TMTVTS

TMTVTS (15.0 g; 0.06 mole) was charged to a 50 mL round bottom flask equipped with a stir bar, thermometer, condenser, and a nitrogen blanket. Tetraethylorthosilicate (9.17 g; 0.044 mole) was added to the TMTVTS and no exotherm was observed. Water (5.94 g; 0.33 mole) was then added in one portion to the reaction mixture and the system was heated to 80° C. for 10 hours. Ammonia was evolved during the reaction. The reaction was cooled to 25° C. and poured into 70 mL of THF. The resulting system was then dried over $CaSO_4$ for 12 hours and filtered. The THF filtrate was rotovapped for 3 hours at 70° C. to give a cloudy low viscosity liquid in a yield of 15.4 g. This product had a TGA char yield of 68 weight percent at 1500° C./$N_2$. It should be noted that no reaction occurred as determined by GC and IR in a TMTVTS/$Si(OC_2H_5)_4$ reaction system run under anhydrous conditions even after heating to 145° C. for 5 hours. Example 15 shows that TMTVTS reacts with water and $Si(OC_2H_5)_4$ at 80° C. to produce a polymer having high char yield.

EXAMPLE 16

Reaction of TMTVTS with PMVS

TMTVTS (10 g; 0.04 mole), PMVS (10 g; similar to Example 8 in Table 1), dicumylperoxide (0.10 g) and 40 mL of toluene were charged to a 100 mL round bottom flask. The reaction mixture was heated to 110° C. for 10 hours under a nitrogen blanket, at which time the initially clear, colorless solution was converted to a clear, colorless gel. The toluene and unreacted TMTVTS were removed on a rotovap at 100° C. for 3 hours. The yield of TMTVTS-modified PMVS was 14 g. Under the reaction conditions described above, approximately 5–6 grams of TMTVTS remained unreacted; this was confirmed by GC and infrared spectroscopy.

In comparison to the infrared spectrum of the unmodified PMVS, the infrared spectrum of the modified PMVS showed significant enhancement of silazane-related bands. Thermal analysis (TGA) of the modified PMVS showed initial weight loss at 470° C. ($N_2$) and a char yield of 82 weight percent at 1500° C./$N_2$.

In comparison, TGA of the unmodified PMVS showed initial weight loss at 200° C./$N_2$ and a char yield of 71 weight percent at 1500° C./$N_2$.

Example 16 shows that the PMVS of the Detailed Description can be reacted with a vinyl substituted silazane such as TMTVTS to yield a reaction product composition having high char yield.

EXAMPLE 17

Reaction OF TMTVTS with P-Aminophenol

TMTVTS (15 g; 0.06 mole) and p-aminophenol (9.6 g; 0.09 mole) were added to a 50 mL round bottom flask equipped with a magnetic stir bar, thermometer and reflux condenser. The reaction mixture (initially a slurry) was heated for 5 hours under a nitrogen blanket. During the first hour of the reaction, the temperature was allowed to increase from the initial 25° C. to 135° C.; during this period copious amounts of ammonia were evolved and a homogeneous solution formed. Over the next two hours, the temperature was increased to 205°–210° C. and was held there for the final two hours of the reaction. The resulting product, an amber colored, moderately viscous liquid, was obtained in a yield of 23 g. Thermal analysis (TGA) of the reaction product showed initial weight loss at 250° C./$N_2$ and a char yield of 73 weight percent at 1500° C./$N_2$.

EXAMPLE 18

Reaction of TMTVTS with m-Aminophenol

TMTVTS (15 g; 0.06 mole) and m-aminophenol (9.6 g; 0.09 mole) were added to a 50 mL round bottom flask equipped with a magnetic stir bar, thermometer, and reflux condenser. The reaction mixture over 5 hours was heated to 211° C. It went from a two phase system to an amber solution. It was held at 211° C. for 2 hours. The resulting product weighed 23.3 g. Thermal analysis (TGA) of the neat resin showed initial weight loss at 250° C./$N_2$ and a char yield of 65 weight percent at 1500° C./$N_2$.

EXAMPLE 19

Reaction of TMTVTS with Matrimid ™ 5292B

4 ,4'- (methylethylidene)bis(2-(2-propenyl)phenol), also known as Matrimid ™ 5292B (35.5 g; 0.12 mole) was dissolved in 25 mL of toluene in a 100 mL round bottom flask. TMTVTS (20 g; 0.08 mole) was added dropwise to the Matrimid ™ 5292B/toluene solution. The reaction mixture was then heated to 120° C. for 5 hours during which time the viscosity increased and ammonia evolved from the system. The final product, a highly viscous yellow resin, was rotovapped at 70° C. to remove toluene and then dried in vacuo for two hours at 80° C. to yield 53.4 g of polymer. TGA of the reaction product showed initial weight loss at 475° C./$N_2$, and a char yield of 61 weight percent at 1500° C./$N_2$. XRD shows $\alpha$ and $\beta$ SiC after pyrolysis of the reaction product at 1400° C./4 hrs/argon.

EXAMPLE 20

Reaction of TMTVTS with Bisphenol A

Bisphenol A (26.3 g; 0.12 mole) was added to 25 mL of toluene in a 100 mL round bottom flask. The contents of the flask were heated to 50° C./$N_2$, and 20 g (0.08 mole) of TMTVTS were added incrementally. The resulting slurry was heated slowly to 90° C. over a 4 hour period. Thirty minutes after the TMTVTS addition, the reaction temperature had reached 55° C.; ammonia evolution was noted and the original slurry converted to a clear, colorless solution. At the end of the four hour reaction period, a highly viscous, gel-like product was further dried in vacuo at 70° C./4 hrs. The product yield was 41.82 g. The product was soluble in toluene, acetonitrile, THF or dichloromethane. TGA of the reaction product showed initial weight loss at 475° C./$N_2$ and a char yield of 63 weight percent at 1500° C./$N_2$. XRD analysis shows $\alpha$ and $\beta$ SiC after pyrolysis of the reaction product at 1400° C./4 hrs/argon.

EXAMPLE 21

Reaction of TMTVTS with 1,1,1-Tris(p-Hydroxyphenyl)Ethane 1,1,1-tris(p-hydroxyphenyl)ethane (THPE) (17.96 g; 0.06 mole) was added to 100 mL of acetonitrile in a 250 mL reactor. The reactor was equipped with a magnetic stirrer, condenser, thermometer, and a $N_2$ purge. 15.0 g (0.06 mole) of TMTVTS was added rapidly from a dropping funnel. A reaction exotherm was noted and the temperature rose to 59° C. with the evolution of $NH_3$. At that time, the system was externally heated for about 25 minutes and the temperature rose to about 68° C. at which point a gel-like material was formed and stirring ceased. 400 mL of $CH_3CN$ was added to the gel-like material and stirred overnight. The gel-like material dissolved and the acetonitrile was rotovapped off and the reaction product was vacuum dried at 75° C. for 2 hours. A product yield of 22.2 grams of a soft wax-like solid was obtained. This product was still soluble in acetonitrile and quite soluble in THF. The TGA of the reaction product showed an initial weight loss at 220° C./$N_2$ and a char yield of 72 weight percent at 1500° C./$N_2$.

EXAMPLE 22

Reaction of 1,3,5,7-Tetramethyl-1,3,5,7-Tetravinylcyclotetrasilazane with 1,1,1-Tris(p-Hydroxyphenyl)Ethane A 250 mL resin kettle reactor was charged with 17.96 g (0.059 mole) of 1,1,1-tris(p-hydroxyphenyl)-ethane (THPE) and 100 ml of $CH_3CN$. The reactor was equipped with a magnetic stirrer, condenser, thermometer, $N_2$ source, and a dropping funnel. The THPE and $CH_3CN$ were heated to 50° C. to form a solution and then cooled to 40° C. Then 15.0 g (0.044 mole) of 1,3,5,7- tetramethyl-1,3,5,7-tetravinylcyclotetrasilazane was added rapidly (over 2–3 minutes) via the dropping funnel. This solution was heated to 65° C. over 20–25 minutes under $N_2$ gas during which time it became more viscous and formed a gel-like material. The gel-like reaction product dissolved in 400 mL of $CH_3CN$. The volatiles were then removed at 70° C. under vacuum with a rotovap.

A product yield of 32.6 g of an off-white solid was obtained. This product adhered tenaciously to the walls of the rotovap container indicating good adhesive characteristics. The TGA of the reaction product showed an initial weight loss at 475° C./$N_2$ and a char yield of 75 weight percent at 1500° C./$N_2$.

Examples 17 through 22 show that compounds containing meta or para substituted phenols can be reacted with TMTVTS to yield reaction products having high char yields as measured at high temperatures under $N_2$ in the TGA. As the reaction mixtures were heated, exothermic reactions were observed along with the evolution of ammonia from the TMTVTS monomers. The product of these reactions was not volatile under the test conditions and had significantly different viscosities than the starting materials.

COMPARATIVE EXAMPLE 23

Reaction of TMTVTS with o-Aminophenol

TMTVTS (15 g; 0.06 mole) and o-aminophenol (9.6 g; 0.09 mole) were added to a 50 mL round bottom flask equipped with a magnetic stir bar, thermometer, reflux condenser and $N_2$ purge. The dark brown slurry was heated over 5 hours to a temperature of 194° C. The temperature was held for 2 hours at 194° C. The resulting product, a dark red-brown solution was obtained in a yield of 13.0 g. Thermal analysis (TGA) of the neat resin showed an initial weight loss at 150° C./$N_2$ and a char yield of 13 weight percent at 1500° C./$N_2$.

COMPARATIVE EXAMPLE 24

Reaction of TMTVTS with Tris(Hydroxymethyl) Aminomethane

TMTVTS (15 g; 0.06 mole) and tris(hydroxymethyl)aminomethane (5.3 g; 0.04 mole) were added to a 50 mL round bottom flask equipped with a magnetic stir bar, thermometer, reflux condenser, and $N_2$ purge. The slurry was heated over the course of one hour to 225° C. The contents were held at 198°–225° C. for 6 hours during which time some gel formed, the solution turned yellowish, and much gas was evolved. An infrared spectrum was run on the product. It was then heated another 7 hours at temperatures from 187° to 222° C. A second infrared spectrum indicated little difference from the sample analyzed after the first period of reaction. The reaction product consisted of 18 g of a yellow oil. Thermal analysis (TGA) of the neat resin, using a temperature increase of 10° C. per minute in a nitrogen atmosphere showed an initial weight loss at 150° C. and a char yield of 22 weight percent at 1500° C.

COMPARATIVE EXAMPLE 25

TGA Analysis of 1,1,1-Tris(p-Hydroxyphenyl) Ethane (THPE)

The TGA using a temperature increase of 10° C. per minute under a nitrogen atmosphere showed an initial weight loss at 280° C. and a char yield of 17 weight percent at 1000° C.

COMPARATIVE EXAMPLE 26

TGA Analysis of Matrimid TM 5292B

The TGA using a temperature increase of 10° C./minute under a nitrogen atmosphere showed an initial weight loss at 300° C. and a char yield of 12 weight percent at 750° C./N$_2$.

COMPARATIVE EXAMPLE 27

TGA Analysis of Bisphenol A

The TGA using a temperature increase of 10° C./minute under a nitrogen atmosphere showed an initial weight loss at 275° C. and a char yield of 2 weight percent at 500° C./N$_2$.

The Comparative Examples 23 and 24 show that the high char yields of Examples 17-21 are not found when ortho amine substituted phenols or aliphatic hydroxyl containing compounds such as 1,1,1-tris(hydroxymethyl)aminomethane are reacted with TMTVTS.

The Comparative Examples 25, 26 and 27 show that the high char yields of Examples 19, 20, 21 and 22 are not attributable to the unreacted components of THPE, Matrimid TM 5292B, or bisphenol A, but are instead the result of an interaction of these components with the TMTVTS or 1,3,5,7-tetramethyl-1,3,5,7-tetravinylcyclotetrasilazane.

The modified silicon-nitrogen monomers (modified TMTVTS) and modified PMVS polymers of this invention are useful as high temperature polymers, binders, matrix resins, coatings, impregnants, adhesives, and fibers. The products of the modification reactions can be used as is (non-pyrolyzed), or after high temperature or free radical crosslinking, or after high temperature charring at 750°-1500° C. These polymers can be combined with other high char yield ceramic or pre-ceramic materials before charring to yield other modified ceramics or refractory compounds.

While in accordance with the Patent Statutes, the best mode and preferred embodiment has been set forth, the scope of the invention is not limited thereto, but rather by the scope of the attached claims.

What is claimed is:

1. A reaction product of a polysilazoxane polymer prepared by the hydrolytic condensation polymerization of cyclic silicon-nitrogen monomers of structure:

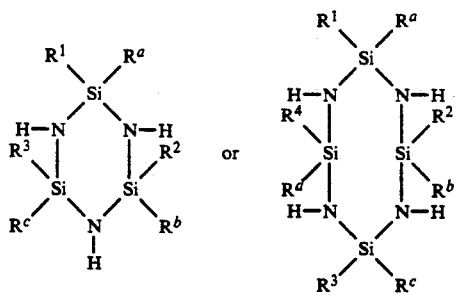

; wherein $R^1$, $R^2$, $R^3$, and $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group;

with vinyl or allyl substituted compounds containing boron or silicon or both in the presence of a free radical source; wherein vinyl or allyl substituted compounds are of the formula $R^1R^2R^3B$, where $R^1$, $R^2$, and $R^3$ are individually hydrogen, alkyls of 1-6 carbon atoms, or alkenyls of 2-6 carbon atoms, or said compounds are $R^1R^2R^3SiR^4$, where $R^1$, $R^2$, $R^3$ and $R^4$ are individually hydrogen, alkyls of 1-6 carbon atoms, or alkenyls of 2-6 carbon atoms, or said vinyl or allyl substituted compounds have molecular weights between 200 and 3000 and are vinyl or allyl containing polysilanes, polycarbosilanes, polysiloxanes, poly(thio) ureasilazanes, polysilazanes, or polysiloxazanes.

2. A reaction product of claim 1, wherein the vinyl substituted or allyl substituted compounds of boron or silicon are boron-vinylborazine, vinyl substituted borazines, 2-vinylpentaborane, triallylborate, dimethylvinylborane, methylvinylborane, trivinylborane, tetramethyldivinylsiloxane, vinyltrimethoxysilane, vinyltrimethylsilane, or vinyl(methoxy) siloxane oligomers of molecular weight from about 300 to about 700.

3. A reaction product of claim 1, wherein the vinyl substituted or allyl substituted compounds of boron or silicon are vinyl containing polysilanes, trivinylmethylsilane, tris(vinyldimethylsiloxy) methylsilane, 1,3,5-trivinyl-1,1,3,5,5-penta-methysiloxane, 1,3-divinyltetramethyldisilazane, divinyldimethylsilane, 1,3,5,7-tetramethyl-1,3,5,7-tetravinylcyclotetrasilazane, or 1,3,5-trimethyl-1,3,5-trivinylcyclotrisilazane.

4. A reaction product of claim 1, wherein said vinyl or allyl substituted compounds containing boron or silicon or both are free of H substituent groups.

5. A reaction product of claim 1, wherein the polysilazoxane polymer before reaction had a molecular weight of at least about 3,000.

6. A reaction product of claim 5, wherein $R^1$, $R^2$, $R^3$, and $R^4$ of the cyclic silicon-nitrogen monomers are independently alkyl groups containing from 1 to 2 carbon atoms, wherein $R^a$, $R^b$, $R^c$, and $R^d$ are independently alkyl or alkenyl groups containing from 2 to 4 carbon atoms.

7. A reaction product of claim 5, wherein said polysilazoxane polymer includes both siloxane and silazane moieties, wherein the water:monomer ratio in the polymerization of polysilazoxane is from about 1.5:1 to about 20:1.

8. A reaction product of claim 1, formed into a shaped article or impregnated into a previously shaped article.

9. A reaction product of claim 7, converted to a ceramic or refractory material.

10. A composite material comprising; the reaction product of claim 7 and particulates, continuous fibers or discontinuous fibers formed into a shaped article or the reaction product of claim 7 as a coating on another refractory or ceramic material.

11. A process for modifying polysilazoxanes made by hydrolytic polycondensation of cyclic silazanes with compounds containing the elements boron or silicon comprising; reacting in the presence of molecules capable of generating free radicals, a vinyl substituted polysilazoxane with vinyl or allyl substituted compounds of boron or silicon or both, or vinyl or allyl substituted polymers of carbosilanes, silazanes, siloxanes, or silanes.

12. A process for the production of high temperature ceramic or refractories comprising; reacting a polysilazoxane made from the hydrolytic condensation polymerization of a monomer of structure:

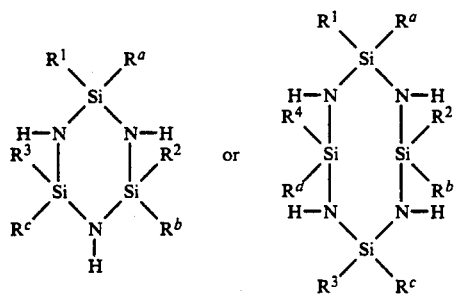

; wherein $R^1$, $R^2$, $R^3$, $R^4$ are independently alkyl groups containing from 1 to 4 carbon atoms, $R^a$, $R^b$, $R^c$, and $R^d$ are independently alkenyl or alkyl groups containing from 2 to 6 carbon atoms with the proviso that at least one of $R^a$, $R^b$, $R^c$, or $R^d$ group is an alkenyl group;

in the presence of vinyl or allyl substituted compounds containing boron or silicon or both, and a free radical source;

wherein said vinyl or allyl substituted compounds containing boron or silicon are of the formula $R^1R^2R^3B$, where $R^1$, $R^2$, and $R^3$ are individually hydrogen, alkyls of 1-6 carbon atoms, or alkenyls of 2-6 carbon atoms, or $R^1R^2R^3SiR^4$, where $R^1$, $R^2$, $R^3$, and $R^4$ are individually hydrogen, alkyls of 1-6 carbon atoms, or alkenyls of 2-6 carbon atoms.

or said vinyl or allyl substituted compounds are between 200 and 3,000 molecular weight polysilanes, polycarbosilanes, polysiloxanes, poly(thio)ureasilazanes, polysilazanes, or polysiloxazanes.

13. A reaction product of claim 1, wherein said polysilazanes or poly(disilyl)silazanes or hybrid silazane/silylamine polymers; or wherein said polysilanes are the reaction product of alkali metal amides or silylamides with polysilanes.

14. A reaction product of claim 1, wherein said polysiloxanes are compounds of the structure —($R^1R^2$Si—O)$_n$ wherein said $R^1$ and $R^2$ are individually hydrogen, alkyls of 1-6 carbon atoms, alkoxys of 1-6 carbon atoms, or alkenyls of 2-6 carbon atoms and n is an integer such that said polysiloxanes have a molecular weight from 200 to 3000.

15. A process for the production of high temperature ceramics or refractories according to claim 12, wherein said polysilazanes are poly(disilyl)silazanes or hybrid silazane/silylamine polymers; or wherein said polysilanes are the reaction product of alkali metal amides or silylamides with polysilanes.

16. A process for the production of high temperature ceramics or refractories according to claim 12, wherein said polysilanes are compounds of the structure —($R^1R^2$Si)$_n$— and said polysiloxanes are of the structure —($R^1R^2$Si—O)$_n$— wherein said $R^1$ and $R^2$ are individually hydrogen, alkyls of 1-6 carbon atoms, alkoxys of 1-6 carbon atoms, or alkenyls of 2-6 carbon atoms and n is an integer such that said polysilanes and said polysiloxanes have a molecular weight from 200 to 3000.

* * * * *